(12) United States Patent
Blanchard (10) Patent No.: US 6,677,934 B1
(45) Date of Patent: Jan. 13, 2004

(54) INFRARED TOUCH PANEL WITH IMPROVED SUNLIGHT REJECTION

(75) Inventor: Randall D. Blanchard, San Diego, CA (US)

(73) Assignee: L-3 Communications, Phoenix, AZ (US)

(*) Notice: Subject to any disclaimer, the term of this patent is extended or adjusted under 35 U.S.C. 154(b) by 0 days.

(21) Appl. No.: 09/364,953

(22) Filed: Jul. 30, 1999

(51) Int. Cl.[7] .................................................. G09G 5/00
(52) U.S. Cl. ........................ 345/175; 345/173; 250/221
(58) Field of Search .............................. 345/173, 175, 345/178; 250/221

(56) References Cited

U.S. PATENT DOCUMENTS

| | | | |
|---|---|---|---|
| 4,243,879 A | 1/1981 | Carroll et al. ............... 250/221 |
| 4,737,633 A | 4/1988 | Sasaki et al. ................ 250/221 |
| 4,739,160 A | 4/1988 | Kawabe et al. .............. 250/221 |
| 4,751,379 A | 6/1988 | Sasaki et al. ................ 250/221 |
| 4,771,170 A | 9/1988 | Hasegawa .................... 250/221 |
| 4,774,404 A | 9/1988 | Hasegawa et al. ........... 250/221 |
| 4,855,590 A | 8/1989 | Bures et al. ................. 250/221 |
| 5,159,323 A | 10/1992 | Mase et al. .................. 340/712 |
| 5,355,149 A * | 10/1994 | Casebolt ...................... 250/221 |
| 5,436,639 A * | 7/1995 | Arai et al. .................... 345/156 |
| 5,463,593 A * | 10/1995 | Zanelli et al. ................ 367/13 |
| 5,515,083 A | 5/1996 | Casebolt et al. ............. 345/175 |
| 5,550,564 A | 8/1996 | Cragun ........................ 345/173 |
| 5,561,541 A | 10/1996 | Sharp et al. .................. 359/66 |
| 5,594,470 A | 1/1997 | Meyerson et al. ........... 345/169 |
| 5,604,517 A | 2/1997 | Filo ............................. 345/173 |
| 5,633,660 A | 5/1997 | Hansen et al. ............... 345/173 |
| 5,668,353 A | 9/1997 | Matsuda et al. .............. 178/18 |
| 5,729,250 A * | 3/1998 | Bishop et al. ............... 345/173 |
| 5,831,600 A | 11/1998 | Inoue et al. .................. 345/173 |
| 6,173,895 B1 * | 1/2001 | Plesko ...................... 235/462.33 |

FOREIGN PATENT DOCUMENTS

JP    4090056667 A  *  1/1997

* cited by examiner

*Primary Examiner*—Bipin Shalwala
*Assistant Examiner*—Ricardo Osorio
(74) *Attorney, Agent, or Firm*—Fletcher Yoder (57) ABSTRACT

Ambient light can saturate the light detectors of a touch screen and cause unreliable operation. To address this concern, one or more filters may be placed proximate the detectors. A first filter may be a spatial filter, such as a microlouvre filter. A microlouvre filter is arranged so that it passes light transmitted by the light detectors and rejects off-axis light. Another filter may be a narrow band optical filter, such as a dichroic notch filter. Such an optical filter passes light having wavelengths within a narrow band selected to correspond to the spectral characteristics of the light emitters, while it rejects light of other wavelengths. The spatial filter and the narrow band optical filter may be used separately or in combination.

14 Claims, 5 Drawing Sheets

INFRARED TOUCH PANEL WITH IMPROVED SUNLIGHT REJECTION

BACKGROUND OF THE INVENTION

1. Field of the Invention

The present invention relates generally to input devices and, more particularly, to improvements for touch panel displays.

2. Background of the Related Art

This section is intended to introduce the reader to various aspects of art that may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Input devices perform the function of providing some means for entering commands and data into a computer, data processor, or information system. A variety of input devices are currently available, including keyboards, light pens, data tablets, mice, track balls, joysticks, scanners, voice recognition devices, and touch screens. Each of these input devices exhibits various advantages and disadvantages, and the input device or devices used in any particular application are typically chosen to maximize the efficient input of information into the system.

This disclosure is primarily directed to the last of the input devices mentioned above, namely touch screens. Unlike the other input devices mentioned above, touch screens not only act as a data input device, they also act as a display unit. Essentially, a touch screen is a display unit with some form of a touch-sensitive surface. Due to this unique characteristic, touch screens are currently utilized in a variety of different applications, such as computer terminals, cash registers, automatic teller machines, and automated gasoline pumps to name just a few.

Currently, there are five different technologies used for touch screens: (1) capacitive, (2) resistive, (3) piezoelectric, (4) surface acoustic wave, and (5) light beam interruption. Although each of these different types of touch screens operate in a different manner and exhibit certain advantages and disadvantages, certain similarities exist. For example, regardless of the type of touch screen, the touch screen system typically includes a sensor unit, which senses the location touched on the display, and a controller unit, which interfaces with the sensor unit and communicates the location information to a system computer. Thus, regardless of the technology employed, each type of touch screen performs the same general function.

However, it is the differences in the way that the various types of touch screens operate that causes a designer to use one type of touch screen over another for a particular application. Resistive touch screens, for example, advantageously exhibit low cost, high touch point density, and can be operated with a gloved hand. Disadvantageously, however, resistive touch screens can be easily damaged, exhibit poor display characteristics, and must typically be calibrated when ambient temperature changes by more than 40 degrees Fahrenheit. Capacitive touch screens also provide high touch point density and low cost, but capacitive touch screens can be easily damaged, must be calibrated due to large temperature changes, and cannot be operated with a gloved hand. In contrast, surface acoustic wave touch screens have no overlay to be damaged or to reduce the visual quality of the display. However, surface acoustic wave touch screens typically exhibit the highest cost and can be falsely triggered by noise, wind, transmission signals, and insects. Thus, it can be seen that these three types of touch screens are typically not well suited for outdoor use where it is desirable for touch screens to be operated by a gloved hand and to be resistant to damage and false triggering.

Touch screens that use light beam interruption, typically called infrared touch screens, usually provide the best performance in outdoor applications. Infrared touch screens exhibit high touch point density, can be operated with heavy gloves, are relatively cost efficient, exhibit good immunity to most false trigger sources, and are extremely rugged and weather sealable.

Infrared touch screens operate in a very simple manner. Light sources, such as infrared photodiodes, are arranged in a row along two adjacent sides of the touch screen, and light detectors, such as photo detectors, are arranged opposite the light emitters along the two opposite adjacent sides of the touch screen. When an infrared touch screen is not being touched, the light beam from each of the light emitters crosses the screen and is received by the respective light detector. When someone touches the screen, one or more light beams are interrupted along each adjacent side so that the respective light detectors no longer receive the transmitted light beams. Because the signals from the light detectors are sent to the controller, the controller recognizes this signal interruption and determines the coordinates on the screen where the touch occurred.

Although infrared touch screens are typically the most suitable type of touch screen to use in outdoor applications, high ambient light conditions, such as direct sunlight, can cause an infrared touch screen to malfunction. High ambient light tends to saturate the light detectors and cause erratic operation of the touch screen. Various techniques have been used to combat this problem. For example, the protective covering which encases the light emitters and the light detectors is typically made of a red plastic material that functions as a broad band infrared filter that tends to filter out ambient light and pass infrared radiation. Also, certain ambient light compensation schemes have been developed which use a large amount of energy to drive the light emitting devices in an effort to maintain the intensity of the emitted light at a level greater than the intensity of the ambient light. Finally, structures such as awnings or shrouds have been used to shield the touch screen from extraneous ambient light.

Of course, each of these techniques exhibits certain disadvantages. In regard to the first mentioned technique, because the red plastic protective member operates as an optical filter in such a broad band, some of the optical energy in the sunlight spectrum is not rejected by the filter. Thus, high ambient light conditions can still trigger erratic operation. The second mentioned technique of boosting the energy to the light emitting devices is similarly ineffective in high ambient light conditions, because the intensity of the sunlight spectrum tends to become greater than the intensity of the light produced by the light emitters. Furthermore, such a light compensation scheme is hampered by the use of expensive light emitting and light detecting devices necessary to handle the increased energy requirements. Finally, in regard to the third mentioned technique of using a structural member to shade the touch screen, it can be readily appreciated that such structures add to the overall cost of the system. Also, in the case of small shrouds constructed to encompass only the touch screen, such shrouds can interfere with user operation and may be broken easily.

The present invention may address one or more of the problems set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a touch screen assembly. The assembly may include an array of emitters and detectors. Each of the emitters are arranged to transmit light along a given path to one of the respective detectors. The emitters transmit light of a first wavelength band and the detectors respond to light of a second wavelength band, where the second wavelength band is broader than the first wavelength band. A spatial filter and/or a narrow band optical filter is disposed adjacent the detectors in the given path of the transmitted light. The spatial filter passes light oriented within a given angular range about the given path and rejects light oriented outside of the given angular range about the given path. The narrow band filter passes light of a third wavelength band, where the third wavelength band is narrower than the second wavelength band.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
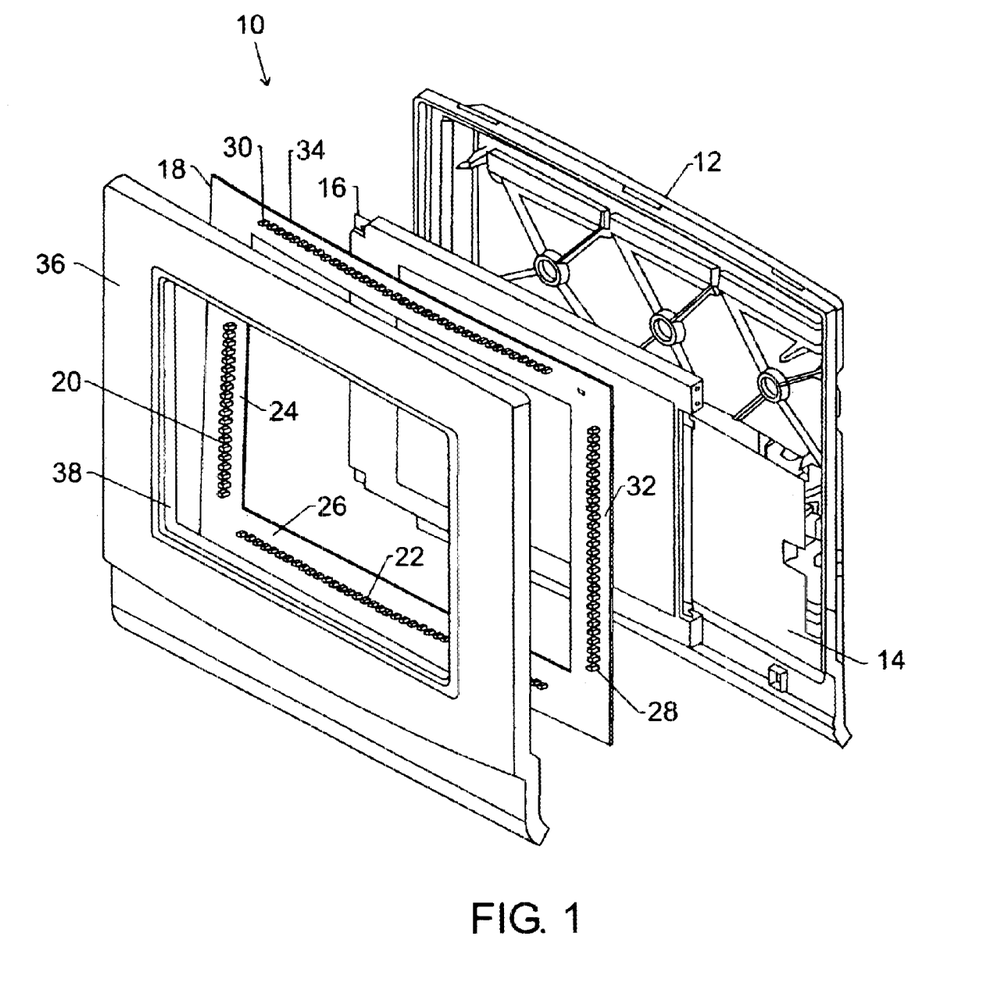
FIG. 1 illustrates an exploded view of a touch screen assembly.

Turning now to the drawings, and referring initially to FIG. 1, a touch screen assembly is illustrated and generally designated by a reference numeral 10. The touch screen assembly 10 includes a mounting plate 12. A controller 14 is illustrated as being mounted onto the mounting plate 12, although the controller 14 may be mounted in a separate location. The touch screen assembly 10 also includes a display screen 16 that may be mounted onto the mounting plate 12. The display screen 16 may take a variety of forms, such as a liquid crystal display or a cathode ray tube.

A light emitter/detector array 18 is mounted in front of the display screen 16. As illustrated, the light emitter/detector array 18 includes a first row of light emitters 20 and a second row of light emitters 22 located along respective adjacent sides 24 and 26, and it further includes a first row of light detectors 28 and a second row of light detectors 30 located along the opposite respective adjacent sides 32 and 34. Essentially, as the light emitters 20 and the associated light detectors 28 form Y axis sensors, and the light emitters 22 and respective light detectors 30 form X axis sensors, as described in detail in reference to FIGS. 2 and 3.

To complete the touch screen assembly 10, a protective face plate 36 is mounted over the array 18 and display screen 16. Advantageously, the face plate 36 is coupled to the mounting plate 12 in a manner which seals and protects the array 18 and the display screen 16 from damage, such as damage caused by impacts or weather. It should also be noted that the face plate 36 includes a bezel 38 that defines the periphery of an opening in the face plate 36 which allows a user to contact the display screen 16. As discussed in detail below, the construction of the bezel 38 may vary, but it should be understood that it generally passes the light emitted from the light emitters 20 and 22 so that it may be received by the light detectors 28 and 30, respectively.

Figure 2:
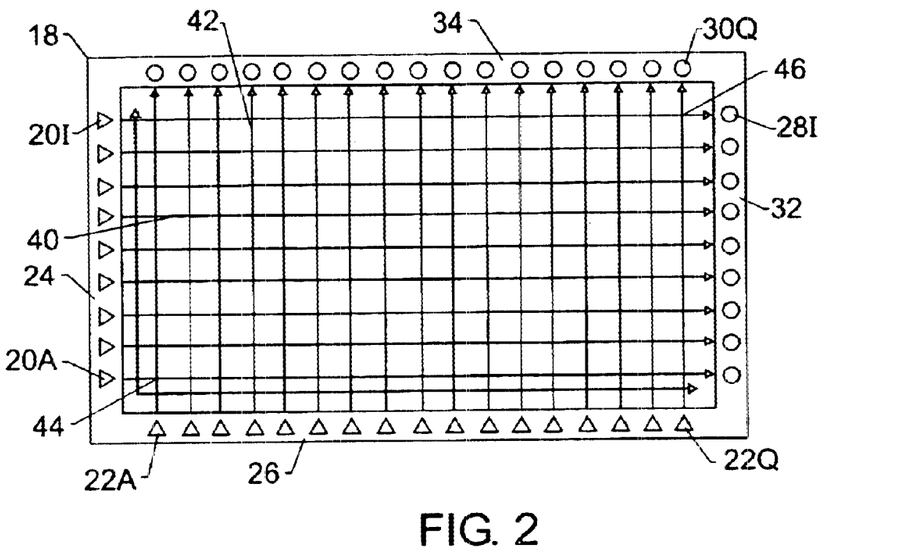
FIG. 2 illustrates a schematic diagram of a touch screen depicting locations of light emitters and light detectors.
Figure 3:
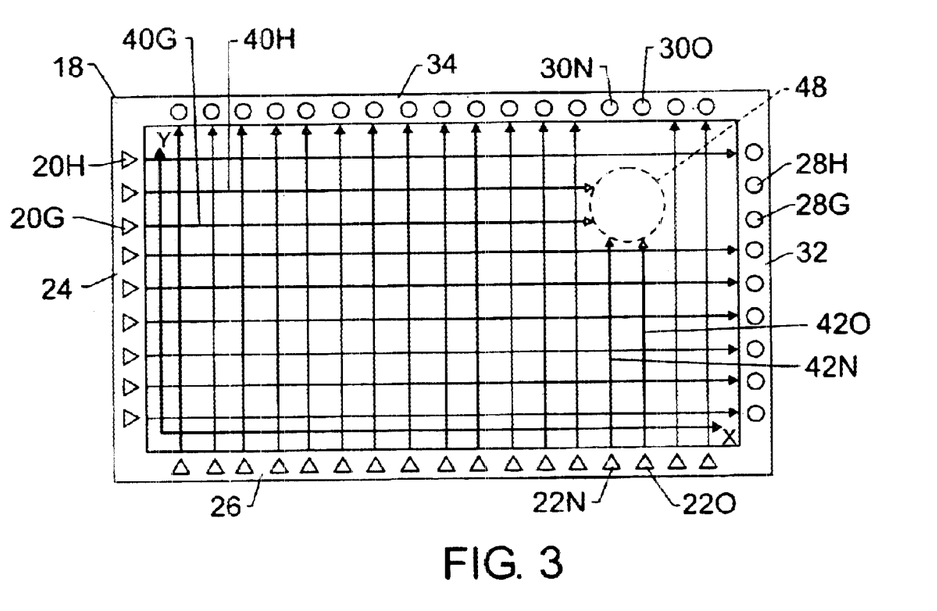
FIG. 3 illustrates a schematic diagram of a touch screen depicting an interruption of light beams caused by touching.

To obtain a better understanding of the manner in which the array 18 functions, FIGS. 2 and 3 illustrate schematic representations of the array 18. Referring first to FIG. 2, each of the light emitters 20 along the side 24 emits a respective light beam 40 which travels across the array 18 in the X direction to be received by the respective light detectors 28 along the opposite side 32. Similarly, each of the light emitters 22 along the side 26 emits a respective light beam 42 which travels across the array 18 in the Y direction to be received by the respective light detectors 30 along the opposite side 34.

It should be noted that FIG. 2 illustrates the operation of the array 18 when it is in its uninterrupted state. In other words, no object has broken any of the light beams 40 or 42 by touching the underlying display screen 16. Thus, each of the detectors 28 and 30 is illustrated as receiving the respective light beam 40 and 42 from the respective light detector 20 and 22. It should further be appreciated that the intersecting light beams 40 and 42 define an X-Y grid or matrix across the entire surface of the underlying display screen 16. In the illustrated example, the intersection 44 of the light beams 40A and 42A from the light emitters 20A and 22A may be considered as location (0,0) on the X-Y matrix, while the intersection 46 of the light beams 40I and 42Q from the light emitteI 20 and 22Q may be considered to define location (16,8) on the X-Y matrix. Thus, the position of an object which touches the underlying display screen 16 anywhere within the array 18 can be detected by the controller 14 determining which detectors 28 and 30 are no longer receiving their respective light signals.

FIG. 3 illustrates one such example. If a person touches the underlying display screen 16 in the area 48, the person's finger blocks the light beams 40G and 40H emitted from the light emitters 20G and 20H from reaching the respective photo detectors 28G and 28H. Similarly, the person's finger blocks the light beams 42N and 42O from reaching the respective detectors 30N and 30O. Thus, the controller 14, which is monitoring the detectors 28A-I and 30A-Q, will recognize that the detectors 30N and 30O along the X axis and the detectors 28G and 28H along the Y axis are no longer receiving their respective light signals. The controller 14 may determine the position of the person's finger to be at approximately location (13.5, 6.5) on the X-Y matrix. The controller 14 may then deliver this information to a host computer, not shown, which correlates this positional information to be relative position of indicia (not shown) displayed on the underlying display screen 16 to determine which function the user has selected by touching the area 48 of the display screen 16. It should be noted that the host computer may take various forms, such as a general purpose computer operating under software control, an application specific computer, or any other appropriate signal processor.

Figure 4:
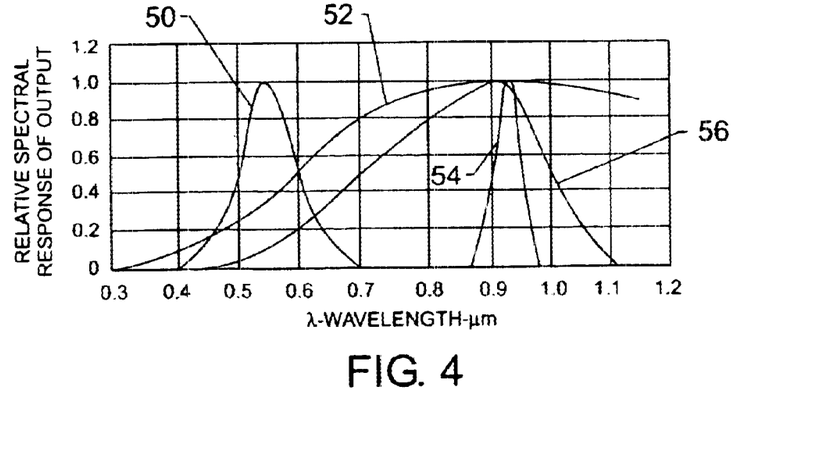
FIG. 4 illustrates a graph depicting various relative spectral characteristics.

As discussed previously, high ambient light conditions, such as direct sunlight, can saturate the detectors 28 and 30 and cause erratic operation of the touch screen assembly 10. The light emitters 20 and 22 are typically selected to be infrared light emitting diodes, and the detectors 28 and 30 are typically selected to be infrared photo detectors. However, it should be understood that a significant amount of energy found in sunlight or other typical light sources falls within the infrared range, thus hampering the effective operation of infrared emitters and detectors. To gain a better understanding of these various relationships, FIG. 4 illustrates the spectral characteristics of a human eye, a typical light source, an infrared LED emitter, and an infrared photo detector. It can be seen that the response of the human eye depicted by the curve 50 begins at the edge of the ultraviolet range at a wave length of about 0.4 micrometers and ends at the beginning of the infrared range at a wave length of about 0.7 micrometers. As can be seen, the human eye sees best between wave lengths of about 0.5 micrometers to about 0.6 micrometers, which is essentially the portion of the spectrum which contains yellow, green, and blue.

The output of a typical light bulb having a tungsten filament is illustrated by the curve 52. As can be seen, the output of such a light source contains a sufficient amount of energy within the range of human sight to illuminate objects so that humans can perceive them more easily. However, of even greater interest in this context, it should be noted that most of the energy of such a light source resides in the infrared range. Indeed, although not illustrated, the spectral characteristics of sunlight are somewhat similar to a tungsten light source in the sense that a significant amount of the energy resides in the infrared range.

To understand why this characteristic of light sources and sunlight may cause problems for an infrared emitter/detector array, the spectral characteristics of an infrared LED emitter and an infrared photo detector are illustrated by curves 54 and 56, respectively. It can be seen that the energy provided by the infrared LED emitter is relatively concentrated between wave lengths of about 0.87 micrometers and 0.98 micrometers, with the bulk of the energy residing between wave lengths of about 0.90 micrometers and 0.96 micrometers. Interestingly, however, it should be noted that the spectral characteristic of the associated infrared photo detector is not nearly so concentrated. Indeed, although its responsiveness peaks at a wave length of about 0.90 micrometers, the infrared photo detector is also responsive to energy within the range of human sight. In other words, although the infrared LED emitter produces light within a relatively narrow wavelength range, its associated infrared detector is quite responsive to light outside of that relatively narrow range. In particular, the infrared photo detector is quite responsive to light emitted at fairly high energy levels by a typical tungsten light bulb. Hence, it is clear that ambient light from such a light source or from the sun could saturate an infrared photo detector. Explained another way, if the infrared photo detectors 28 and 30 were receiving high levels of ambient light from a tungsten source light bulb or the sun, it would appear to those detectors that they were receiving the light emitted from the infrared LED emitter. When a person breaks the light beam delivered by the infrared LED emitter, the infrared photo detectors will not react to the absence of the light beam because they are still receiving high levels of ambient light. Thus, touching the display screen 18 causes no reaction from the system, since the infrared photo detectors are still receiving enough energy from the ambient light.

Figure 5:
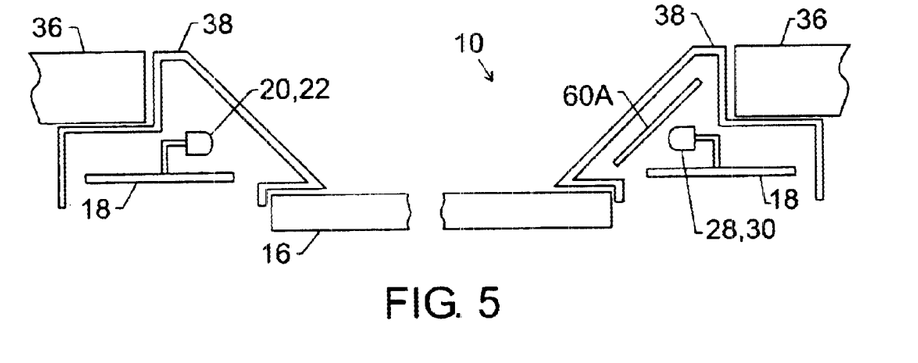
FIG. 5 illustrates a schematic cross-sectional view of a touch screen assembly having a filter in accordance with the present invention.
Figure 7:
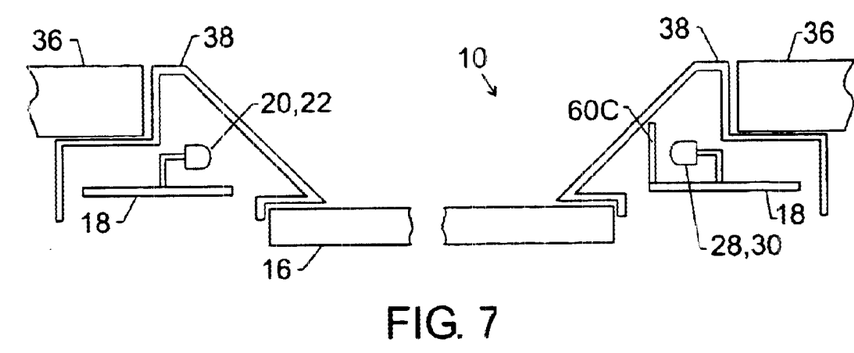
FIG. 7 illustrates a schematic cross-sectional view of a touch screen assembly having a filter in accordance with the present invention.
Figure 8:
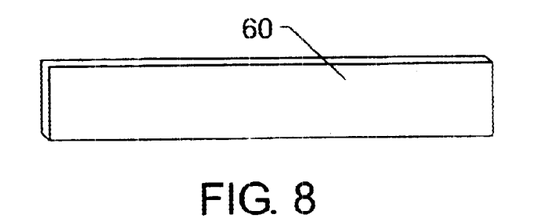
FIG. 8 illustrates a filter strip of the type illustrated in FIGS. 5, 6, and 7.

To address this problem, one or more filters may be placed in front of the detectors 28 and 30. Before discussing the types of filters which may be used, the placement of such filters will first be described. Three different configurations of the touch screen assembly 10 are illustrated in a schematic cross section in FIGS. 5, 6, and 7. The filter may be configured in a strip, as illustrated by the filter 60 shown in FIG. 8. Referring first to FIG. 5, a filter element 60A may be placed in front of each detector 28, 30. In this embodiment, the filter 60A may be mounted in any suitable manner so that it is spaced apart from the inner surface of the bezel 38 and spaced apart from the detectors 28, 30. In an alternate configuration illustrated in FIG. 6, a similar filter element 60B may be coupled to the inner surface of the bezel 38 by any suitable means, such as mechanical fasteners or adhesive. Finally, in the alternate embodiment illustrated in FIG. 7, the filter element 60C may be mounted perpendicularly on the array 18, rather than being oriented along the oblique angle of the bezel 38. Regardless of the manner in which the filter 60 is mounted or oriented in front of the detectors 28, 30, it should be understood that the primary function of the filter 60 is to pass light transmitted from the emitters 20 and 22 and to block unwanted light, such as ambient light.

To achieve this function, two different types of filter elements may be used. The first type of filter element is a narrow band optical filter, such as a reflective dichroic notch filter or an absorptive glass filter, which is typically formed by disposing optical filter coatings on a glass substrate. An optical filter of this type primarily addresses the differences in spectral characteristics between the infrared LED emitters and infrared photo detectors discussed with reference to FIG. 4. In other words, a narrow band optical filter passes light in a range similar to that of the infrared LED emitter while filtering out light of other wave lengths, thus effectively modifying the spectral response characteristic of the infrared photo detectors by removing light at other wavelengths. Following this example, satisfactory results may be obtained with a narrow band optical filter having a spectral response characteristic from a wavelength of about 0.85 micrometers to about 1.0 micrometers. However, more advantageous results should be obtained by further narrowing the spectral response characteristic of the narrow band optical filter to tailor it to the particular spectral characteristic of the infrared LED emitters being used. Thus, in this example, it would be advantageous to use a narrow band optical filter having a spectral response characteristic at least from a wave length of 0.87 micrometers to 0.98 micrometers, and more advantageously from a wave length of about 0.90 micrometers to about 0.95 micrometers.

If a narrow band optical filter is being used as the filter 60, it is advantageous for it not only to be placed directly in the path of the light beam from the emitters 20 and 22 to the detectors 28 and 30, but also for it to be placed in such a manner so as to block ambient light entering through the bezel 38 from other directions. Indeed, although the filter 60 is illustrated as a relatively planar strip, a narrow band optical filter could easily be formed into other suitable shapes, such as an arcuate shape, to encompass or block the detectors 28 and 30 in a suitable manner. In fact, it may even be desirable to dispose suitable optical coatings on the bezel 38 so that it operates as a narrow band optical filter, in which case a separate narrow band optical filter 60 would not be used.

While the narrow band optical filter described above offers clear improvements over conventional techniques, another type of filter 60 may also be used. The filter 60 may be a spatial filter, such as a microlouvre filter available from 3M for instance. Such a microlouvre filter may be a thin plastic film made of polycarbonate which contains closely spaced black microlouvres. The films simulate a tiny venetian blind to shield out unwanted ambient light, such as off-axis sunlight, with minimal impact on the light beams transmitted by the emitters and received by the detectors.

Figure 6:
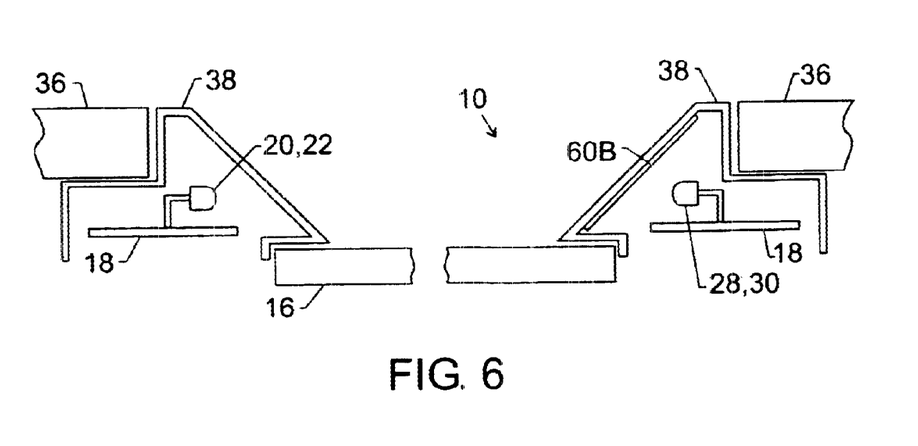
FIG. 6 illustrates a schematic cross-sectional view of a touch screen assembly having a filter in accordance with the present invention.
Figure 9:
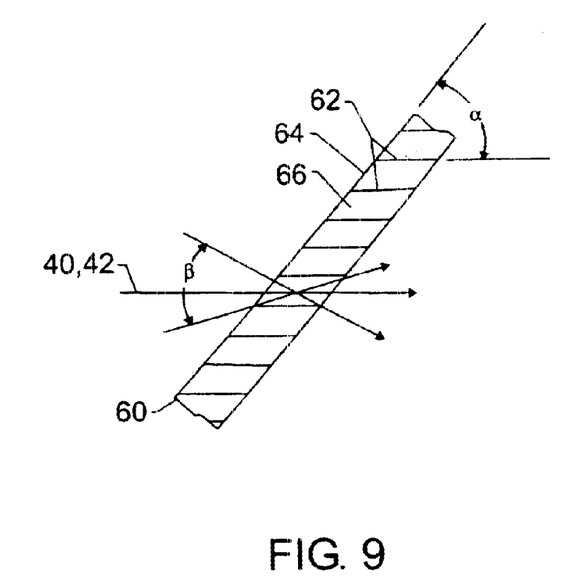
FIG. 9 illustrates a cross-sectional view of one embodiment of the filter strip illustrated in FIG. 8.

The tiny black louvres in microlouvre material may be oriented substantially perpendicular to the plane of the film or at an oblique angle relative to the plane of the film. An example of the latter version is illustrated in partial cross-section in FIG. 9. If the filter 60 is to be disposed to match the slant of the bezel 38, as illustrated in FIGS. 5 and 6, then the angle α between the microlouvres 62 and the substantially planar face 64 of the microlouvre filter 60 should be approximately equal to the slant of the bezel 38. Arranged in this manner, it can be seen that the light beams 40, 42 from the emitters 20, 22 pass easily through the transparent portions 66 of the microlouvre filter 60 between the microlouvres 62. The microlouvre filter 60D exhibits a transmission angle β which defines the area allowing off-axis light to pass between the microlouvres 62. Any light directed at the microlouvre filter 60D at an angle other than within the transmission angle β is rejected. The transmission angle β is generally determined by the thickness of the filter 60, the width of each microlouvre 62, and the spacing between the microlouvres 62. For example, the transmission angle β tends to decrease as the width of the filter increases, as the thickness of the microlouvres 62 increases, or as the spacing between the microlouvres 62 decreases. Currently, it is believed that a transmission angle β between about 20 degrees and 60 degrees should provide satisfactory results, with a transmission angle β between about 24 degrees and about 48 degrees providing more advantageous results.

Figure 10:
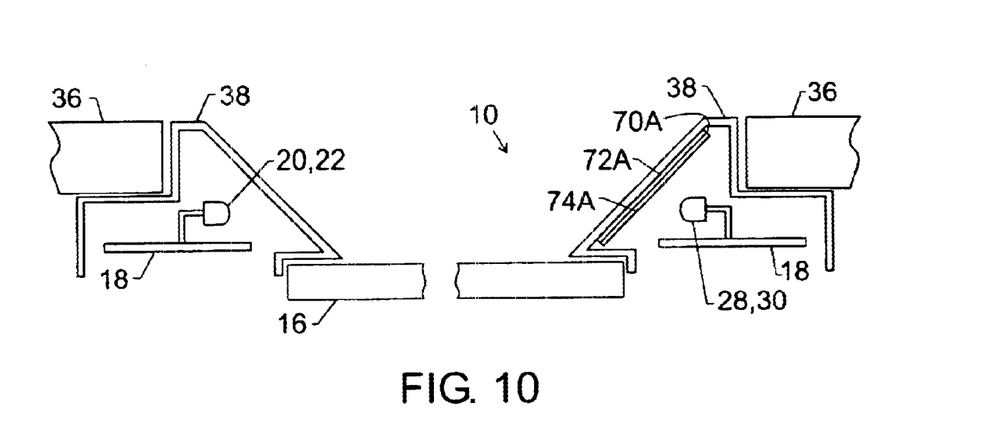
FIG. 10 illustrates a schematic cross-sectional view of a touch screen assembly having a filter in accordance with the present invention.

Although the filter 60 may be composed of either a narrow band optical filter or a spatial filter, as described above, the filter 60 may also be composed of a combination of a narrow band optical filter and a spatial filter. Referring now to FIG. 10, a filter 70A is illustrated as being disposed between the bezel 38 and the detectors 28, 30. The filter 70A includes a narrow band optical filter 72A and a spatial filter, such as a microlouvre filter 74A. In this embodiment, the narrow band optical filter 72A is disposed on the inner surface of the bezel 38, and the microlouvre filter 74A is disposed on the back side of the narrow band optical filter 72A. The filters 72A and 74A may be mounted within the touch screen assembly 10 using any suitable technique, such as mechanical fasteners and/or adhesive. At least in the arrangement illustrated in FIG. 10, it is not believed that the order in which the filters 72A and 74A are arranged significantly affects the performance of the touch screen assembly 10. Arranged as shown, the narrow band optical filter 72A should filter out all light regardless of orientation except that light corresponding generally to the same wavelength as light being produced by the emitters 20, 22. Light within this range that is oriented outside of the transmission angle β of the microlouvre filter 74A is then rejected by the microlouvre filter 74A.

Figure 11:
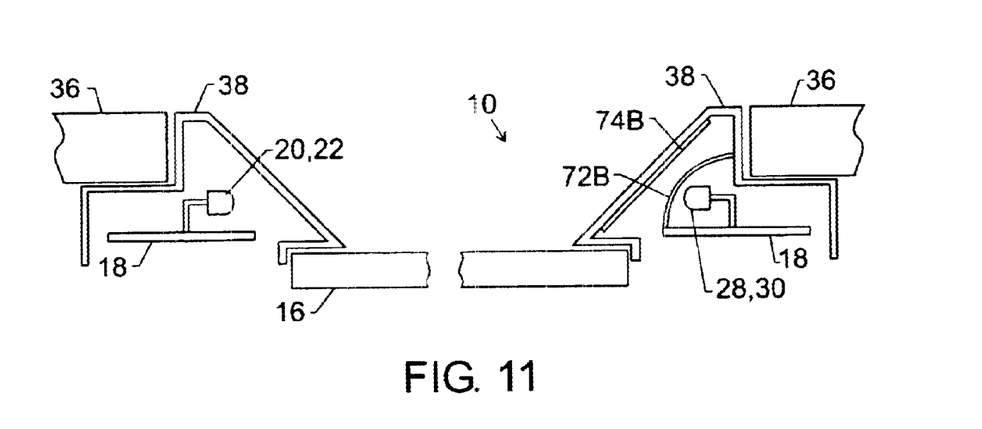
FIG. 11 illustrates a schematic cross-sectional view of a touch screen assembly having a filter in accordance with the present invention.

Various other arrangements of a narrow band optical filter and a spatial filter may also provide satisfactory results. For example, as illustrated in FIG. 11, a relatively planar microlouvre filter 74B is disposed along the inner surface of the bezel 38, while an arcuate narrow band optical filter 72B is disposed about the detectors 28, 30. In this arrangement, the microlouvre filter 74B passes all light oriented within the transmission angle β. The narrow band optical filter 72B then rejects all portions of the spectrum of the light transmitted through the microlouvre filter 74B except for the portion of the spectrum that generally corresponds to the light produced by the emitters 20, 22.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A touch screen system comprising:

an array of emitters and detectors, each of the emitters being arranged to transmit light along a path to one of the respective detectors, wherein the emitters transmit light of a first wavelength band and the detectors respond to light of a second wavelength band, the second wavelength band being broader than the first wavelength band;

a narrow band optical filter disposed adjacent the detectors in the path of the transmitted light, the narrow band filter passing light of a third wavelength band, the third wavelength band being narrower than the second wavelength band;

a display screen disposed adjacent the array;

a controller being coupled to the detectors, the controller delivering a position signal in response to at least one of the respective detectors failing to receive the light transmitted from its respective emitter; and a host computer coupled to the display screen and to the controller to receive the position signal.

2. The system, as set forth in claim 1, further comprising a face plate disposed over the array and the display screen.

3. The system, as set forth in claim 1, further comprising a bezel disposed about the array, the bezel being generally transparent to light of the first wavelength band.

4. The system, as set forth in claim 3, wherein the filter is mounted onto an inner surface of the bezel.

5. The system, as set forth in claim 1, wherein the narrow band optical filter comprises a dichroic notch filter.

6. The system, as set forth in claim 1, wherein the third wavelength band is substantially equal to the first wavelength band.

7. The system, as set forth in claim 1, wherein the third wavelength band is narrower than the first wavelength band.

8. The system, as set forth in claim 1, wherein the emitters comprise infrared light emitting diodes.

9. The system, as set forth in claim 1, wherein the detectors comprises infrared photodetectors.

10. In a touch screen system comprising an array of emitters and detectors, each of the emitters being arranged to transmit light along a path to one of the respective detectors, wherein the emitters transmit light of a first wavelength band and the detectors respond to light of a second wavelength band, the second wavelength band being broader than the first wavelength band, a display screen disposed adjacent the array, a controller being coupled to the detectors, the controller delivering a position signal in response to at least one of the respective detectors failing to receive the light transmitted from its respective emitter, and a host computer coupled to the display screen and to the controller to receive the position signal, the improvement comprising:

a narrow band optical filter disposed adjacent the detectors in the path of the transmitted light, the narrow band filter passing light of a third wavelength band, the third wavelength band being narrower than the second wavelength band.

11. The system, as set forth in claim 10, wherein the narrow band optical filter comprises a dichroic notch filter.

12. The system, as set forth in claim 10, wherein the third wavelength band is substantially equal to the first wavelength band.

13. The system, as set forth in claim 10, wherein the third wavelength band is narrower than the first wavelength band.

14. In a touch screen system comprising an array of emitters and detectors, each of the emitters being arranged to transmit light along a path to one of the respective detectors, wherein the emitters transmit light of a first wavelength band and the detectors respond to light of a second wavelength band, the second wavelength band being broader than the first wavelength band, a display screen disposed adjacent the array, a controller being coupled to the detectors, the controller delivering a position signal in response to at least one of the respective detectors failing to receive the light transmitted from its respective emitter, and a host computer coupled to the display screen and to the controller to receive the position signal, the improvement comprising the act of:

disposing a narrow band optical filter adjacent the detectors in the path of the transmitted light, the narrow band filter passing light of a third wavelength band, the third wavelength band being narrower than the second wavelength band.

* * * * *